United States Patent [19]

Mori et al.

[11] 3,976,819
[45] Aug. 24, 1976

[54] RESIN-COATED GLASS BOTTLES

[75] Inventors: Atsuo Mori, Takatsuki; Kozo Tsuji, Ibaragi; Shuji Kitamura, Toyonaka, all of Japan

[73] Assignees: Sumitomo Chemical Company, Limited, Osaka; Hayashibara Biochemical Laboratories, Incorporated, both of Japan

[22] Filed: Feb. 25, 1975

[21] Appl. No.: 552,875

[30] Foreign Application Priority Data
Feb. 27, 1974 Japan............................ 49-24620

[52] U.S. Cl. ................................. 428/35; 427/407; 428/332; 428/413; 428/425; 428/426; 215/1 R
[51] Int. Cl.² ................... B32B 27/38; B32B 17/06; B32B 17/10
[58] Field of Search.............. 428/35, 426, 33, 14 B; 427/425, 407; 195/31 R, 31 P; 215/1 R

[56] References Cited
UNITED STATES PATENTS

| 3,784,390 | 1/1974 | Hijiya et al. ........................ 106/139 |
| 3,823,032 | 7/1974 | Ukai ..................................... 428/35 |
| 3,870,537 | 3/1975 | Hijiya et al. ........................ 106/162 |
| 3,888,809 | 6/1975 | Nakashio et al. .................. 260/17.2 |

FOREIGN PATENTS OR APPLICATIONS
2,235,991   7/1972   Germany

*Primary Examiner*—Harold Ansher
*Assistant Examiner*—P. J. Thibodeau
*Attorney, Agent, or Firm*—Stevens, Davis, Miller & Mosher

[57] ABSTRACT

A resin-coated high pressure glass bottle prepared by forming a first layer with pullulan on the exterior surface of a high pressure glass bottle and then overcoating this first layer with a resin of high alkali resistance, e.g. an epoxy, urethane or ethyl cellulose resin.

3 Claims; No Drawings

RESIN-COATED GLASS BOTTLES

This invention relates to a resin-coated high pressure bottle prepared by applying resin coatings on the exterior of a high pressure glass bottle, thereby preventing the bottle from such danger as scattering of glass fragments at the time of rupture of the bottle. More particularly the invention pertains to a resincoated high pressure glass bottle prepared by forming a first layer with pullulan on the exterior surface of a high pressure glass bottle and overcoating this first layer with a resin of high alkali resistance.

The inner pressure of a bottle containing such carbonated as soda pop or Coca Cola or beer sometimes reaches at most 8 kg/cm$^2$. Accordingly, there are some cases where the bottle is ruptured due to flaws or deformation or to rapid change of external temperature thus causing the danger of scattering fragments of glass.

The bottle dealt with in the present invention is for carbonated drinks or beer and is to be reused ten and more times, and hence should be excellent in resistance against alkaline solution in the course of washing. The bottle should also be excellent in transparency and appearance it should not be whitened due to peeling of coated layers from the glass by impact suffered at the time of use or in the bottling step or the like, and the coating should have sufficient hardness to prevent the bottle from crack formation. It is also necessary to make the resin coatings as thin as possible so as to attain economical advantages.

Heretofore, decorations or bottles have chiefly been protectively coated with resins so as to prevent them from formation of cracks. For example, Japanese Pat. Publication No. 16319/72 teaches that bottles are protectively coated with such resins as ethylenevinyl acetate copolymers, polyethylenes or polycarbonates. However, none of these resins can effectively prevent the scattering of glass fragments which takes place at the time of rupture of bottles having such high inner pressures as reaching 8 kg/cm$^2$, and no resin coating capable of satisfying all the above-mentioned properties have ever been known hitherto.

That is, ethylene-vinyl acetate copolymers are low in hardness, and hence tend to form cracks with ease; polyethylenes are poor in adhesion to glass, and hence peel off during use of glass bottles coated therewith; and polycarbonates are low in alkali resistance.

The present inventors made extensive studies on resins which, when coated on high pressure bottles, not only could prevent the scattering of glass fragments at the time of rupture of the bottles but also could satisfy all the aforesaid properties. As the result, the inventors have found that a glass bottle, the exterior surface of which has been coated with a resin composed of pullulan to form a first layer and then the first layer has been overcoated with a resin excellent in alkali resistance, can effectively satisfy the abovementioned requirements.

An object of the present invention is to provide a glass bottle coated with resins capable of preventing the scattering of glass fragments at the time of rupture of the bottle.

Another object is to provide a glass bottle coated with resins that are excellent in alkali resistance, transparency and hardness.

Other objects and advantages of the invention will become apparent from the following explanation.

The thickness of the pullulan coating layer of the present invention varies depends on the shape, inner pressure, etc. of the bottle to which the layer is to be applied, but is at least 100 $\mu$, preferably 100 to 1,000 $\mu$ in the case of a glass bottle having an inner pressure of, for example, 3 kg/cm$^2$, and is at least 200 $\mu$, preferably 200 to 1,000 $\mu$ in the case of a glass bottle having an inner pressure of 8 kg/cm$^2$.

The thickness of the resin coating layer excellent in alkali resistance, which is coated on said pullulan coating layer, is optional, but, in view of the alkali resistance thereof, is at least 10 $\mu$, preferably 10 to 500 $\mu$. Examples of the resin, which is used to impart alkali resistance to the pullulan coating layer used in the present invention, include epoxy, urethane and ethyl cellulose resins. Among these, the urethane resins, which are excellent in abrasion resistance and durability, are desirably used.

The available pullulan is a linear high polymer, in which units of maltotriose, a trimer of glucose, have repeatedly been bonded through an $\alpha$-1,6 linkage, which is a linkage different from said trimer, and has such molecular structure as shown below.

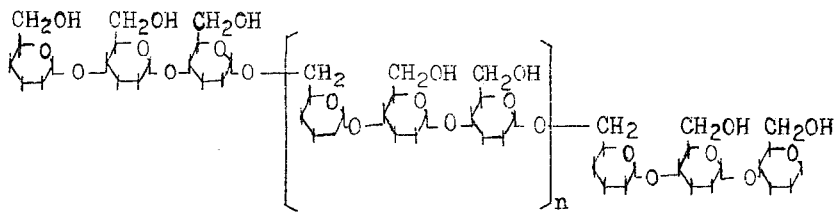

wherein n represents the polymerization degree, and is an integer of 20 to 10,000.

Heretofore, the pullulan has been known only as a water-soluble tacky substance, and the properties thereof have been obscure without being reported. Furthermore, no research concerning the uses thereof has been conducted until recently. Accordingly, the pullulan is a novel substance unknown to the field of resin coating.

The pullulan used in the present invention is not particularly restricted in procedure for the preparation thereof, and may be prepared either by chemical synthesis or biochemical synthesis (e.g. U.S. Pat. No. 3,827,937). At present, however, it can be obtained as a tacky substance secreted in a culture liquor formed by culturing a strain of the genus Pullularia which is an incomplete microorganism. That is, pullulan can be obtained as a tacky substance secreted in a culture liquor formed by subjecting a strain *Pullularia pullulans* to shaking culture at 24°C. for 5 days in a medium containing 10% of sucrose or glucose, 0.5% of K$_2$HPO$_4$, 0.1% of NaCl, 0.02% of MgSO$_4$·7H$_2$O, 0.06% of (NH$_4$)$_2$SO$_4$ and 0.04 % of yeast extract. If necessary, purified pullulan may be obtained by removing the cells by centrifugation from the culture liquor, and then subjecting the supernatant to precipitation, followed by isolation. Pullulan varies more or less in physical properties depending on the kind of the strain used. This, however, is not greatly connected to the properties of the pullulan used as a resin coating material. Pullulan is excellent in transparency, strength and adhesiveness to the glass and thus is desirable as a coating material.

The molecular weight of pullulan used in the present invention is at least 50,000. If the molecular weight is less than 50,000, it is impossible to expect effective prevention of scattering of glass fragments at the time of rupture of bottle. The molecular weight of usable pullulan is in the range of 50,000 to 3,500,000, preferably 100,000 to 3,400,000. In order to increase the flexibility of pullulan and to expect more effective prevention of glass fragments at the time of rupture of the bottle, pullulan may be incorporated with a plasticizer such as glycerin, dimethyl sulfoxide, dimethyl formamide, ethylene glycol or propylene glycol.

Pullulan can be used as an adhesive for ceramics or papers. In the case of the coated bottle of the present invention also, pullulan acts effectively as an adhesive for bonding glass to a resin layer excellent in alkali resistance. Pullulan is stronger in adhesiveness than polyvinyl alcohols. Even when the coated bottle is ruptured, cohesive destruction or strong adhesion similar thereto is observed between the glass and the resin layer, and no scattering of glass fragments takes place.

It is surprising that in the case of the resin-coated glass bottle of the present invention, the scattering of glass fragments at the time of rupture of the bottle can effectively be prevented by a thin resin coating layer of at least 100 $\mu$ in thickness which is composed mainly of pullulan. Even if there is used any of ethylene-vinyl acetate copolymer resins, polycarbonate resins, methyl methacrylatebutadiene-styrene graft copolymer resins and cellulose type resins, which have been known as tough resins excellent in impact resistance and tear resistance, the same effect as in the present invention cannot be attained unless the coating layer of said resin is made 2 or 3 or more times thicker than the resin layer composed mainly of pullulan. This is economically disadvantageous, and brings about such disadvantages that glass bottles having thick coatings cannot be utilized in conventional bottling steps, and thus the bottlings steps should be modified to a great extent. The resin coating layers of the present invention may be incorporated with dyes, pigments, light and heat stabilizers, antioxidants and the like additives which are added to conventional resins.

The resin-coated glass bottle of the present invention can be produced according to various processes. For example, an aqueous pullulan solution, which has sometimes been incorporated with an alcohol such as methanol, ethanol or isopropanol in order to control the evaporation speed of the solution, is coated on the exterior of a glass bottle by dipping, brushing or spraying to form a resin layer having a desired thickness. In some cases, the solution is incorporated with a boric acid or colloidal silica in order to enhance the processability of the solution. By the above treatment, the glass bottle can effectively be prevented from scattering of glass fragments at the time of rupture thereof. However, the layer formed by the above-mentioned treatment on the glass bottle is not sufficient in alkali resistance, so that on the pullulan layer thus formed, a resin excellent in alkali resistance is further coated in the same manner as above to complete the production of the resin-coated glass bottle of the present invention.

In order that the protective layer of a coated glass bottle not peel off during the use of the bottle or in the bottling step, a strong adhesive power is required to be present between the glass and the coating material. Since the coated glass bottle of the present invention uses pullulan that is excellent in adhesiveness, no such peeling of the coated layer takes place, and glass fragments do not come off from the pullulan layer even after rupture of the glass bottle. If the adhesive power of an adhesive applied to a glass bottle is strong, a stress-concentrating phenomenon occurs at cracked portions formed in the glass bottle, with the result that the glass bottle is ruptured if conventional adhesive material is used. Thus, it is generally anticipated that if an adhesive has firmly adhered, like pullulan, to a glass bottle, the bottle is necessarily ruptured to scatter glass fragments. In the case of pullulan, however, the rupture of the glass bottle is effectively prevented contrary to the anticipation. This is considered ascribable to such specific combined properties of the pullulan itself as being high in tensile strength, tackiness and tear strength.

In producing glass bottles, used and broken glass bottles are reused as part of the starting materials. The reuse of broken glass bottles results, at the time of fusion of the glass bottles, in the generation of carbon due to incomplete combustion of the coating materials used therein, and brings about the problem that the resulting fresh glass bottles are deteriorated in quality and particularly colored black. Accordingly, it becomes necessary to remove the coating materials before the reuse of broken glass bottles. The coated glass bottle of the present invention uses water-soluble pullulan as the coating material, so that when the glass bottle is ground into small pieces and then treated with hot water, the pullulan layer is dissolved to make it possible to separate easily the ground glass bottle pieces into a resin layer excellent in alkali resistance, an aqueous pullulan solution and glass pieces. It is a feature of the present invention that the coating material can be completely removed from the coated glass bottle by such simple aftertreatment as the above-mentioned hot water treatment.

The present inventors previously invented a glass bottle coated with polyvinyl alcohol in place of pullulan. However, pullulan is more easily soluble than polyvinyl alcohol, so that the after-treatment of the coated glass bottle is markedly facilitated. Moreover, pullulan is a natural substance and is spontaneously decomposed, so that no problem concerning the after-treatment thereof is brought about.

An aqueous pullulan solution is low in viscosity, and hence is advantageous in that it is more excellent in dip-coating ability than an aqueous polyvinyl alcohol solution.

The present invention illustrated in more detail below with reference to examples, but the invention is not limited to the examples.

In the examples, the bottle rupture test, investigating the degree of scattering of glass fragments at the time of the rupture of bottle, was carried out in such a manner that carbonated water was filled in a resin-coated glass bottle to an inner pressure of 8 kg/cm$^2$, a steel ball of 500 g. in weight was thrown at said bottle to forcibly rupture the bottle, and the rupture resistance of the bottle was evaluated by the degree of scattering of glass fragments. The alkali resistance test was carried out by dipping the above-mentioned bottle in a 4% aqueous potassium hydroxide solution at 40°C. for 10 minutes, and the alkali resistance was evaluated by the change in appearance of the bottle after repeating the above operation 20 times. The sliding property was evaluated by comparing the sliding between two of the above-mentioned bottle with the sliding between the uncoated glass bottles.

EXAMPLE 1

A Coca Cola bottle of 500 ml. in volume was repeatedly dipped in a 20% aqueous solution of pullulan having a molecular weight of 400,000 to form on the exterior surface thereof a coating of about 200 μ in thickness. The coating was gradually heated from 50°C. to 150°C., while preventing the formation of foams, to evaporate water, whereby a transparent, hard and tough coating could be formed on the bottle.

Subsequently, the bottle coated with said resin was dipped in a 10% ethanol solution of ethyl cellulose to form on the above-mentioned coating an alkali resistant resin coating of about 30 μ in thickness. The resin-coated bottle thus obtained was transparent and hard, and was similar in sliding property to an uncoated glass bottle. Further, the bottle, when subjected to the alkali resistance test, showed no change in appearance, and, when subjected to the bottle rupture test, showed no peeling between glass and pullulan and no scattering of glass fragments at all.

EXAMPLE 2

Example 1 was repeated; except that the pullulan-coated bottle was treated not with the ethanol solution of ethyl cellulose but with an epoxy resin solution consisting of 100 parts (by weight) of Epikote$^R$ 828 (*1 Product obtained by dehydrochlorination reaction of 1 mole of bisphenol A and 2 moles of epichlorohydrin produced by Shell chemical Co.), 50 parts of Epomate$^R$ B-001 (*2 bis-Cyanoethyl amino-propyl tetraoxaspiro undecane produced by Ajinomoto Co., Ltd.) and 1.000 parts of ethanol, to form on the pullulan coating an epoxy resin coating of about 50 μ in thickness. The resin-coated bottle thus obtained was transparent and hard, and was similar in sliding property to an uncoated glass bottle. Further, the bottle, when subjected to the alkali resistance test, showed no change in appearance, and, when subjected to the bottle rupture test, showed no scattering of glass fragments at all.

EXAMPLE 3

Example 1 was repeated, except that the pullulan-coated bottle was treated not with the ethanol solution of ethyl cellulose but with a urethane resin solution comprising 220 parts (by weight) of Desmodur$^R$ L-75 (*1 A polymer of 1 mole of trimethylolpropane and 3 moles of tolylene diisocyanate, containing 25% of ethyl acetate produced by Bayer Co.), 100 parts of Desmophen$^R$ 550U (*2 An ether compound of 1 mole of trimethylolpropane and 3 moles of polypropylene glycol, molecular weight; about 550 produced by Bayer Co.) and 320 parts of ethyl acetate, to form on the pullulan coating an alkali-resistant urethane resin coating of about 50 μ in thickness. The resin-coated bottle thus obtained was transparent and hard, and was similar in sliding property to an uncoated glass bottle. Further, the bottle, when subjected to the alkali resistance test, showed no change in appearance, and, when subjected to the bottle rupture test, showed no scattering of glass fragments at all.

The resin-coated glass bottle was immersed in water and boiled, whereby the pullulan layer was swollen. Due to the swelling pressure, the urethane layer was destroyed. When the boiling was further continued, the urethane layer could be peeled off quite easily from the bottle, and the pullulan layer was dissolved in water. Thus, a bottle completely freed from the coated resin layers could be obtained.

What is claimed is:

1. A resin-coated glass bottle which comprises a pullulan resin coating layer on the exterior surface of a bottle, and an alkali resistant resin coating layer on said pullulan resin coating layer, wherein the thickness of the pullulan resin coating layer is 100 to 1,000μ, wherein the thickness of the alkali-resistant resin coating layer is 10 to 500μ and wherein the molecular weight of the pullulan resin is 50,000 to 3,500,000.

2. A resin-coated glass bottle according to claim 1, wherein the alkali-resistant resin is an epoxy, urethane or ethyl cellulose resin.

3. A resin-coated glass bottle according to claim 1, wherein the alkali-resistant resin is an urethane resin.

* * * * *